United States Patent [19]
Kuroki et al.

[11] Patent Number: 5,309,422
[45] Date of Patent: May 3, 1994

[54] LIGHT SEPARATION ELEMENT AND LIGHT RECEIVING OPTICAL DEVICE USING SAME

[75] Inventors: Kazuhiko Kuroki, Sendai; Hiroshi Shiozaki, Iwanuma, both of Japan

[73] Assignee: Alps Electric Co., Ltd., Tokyo, Japan

[21] Appl. No.: 893,134

[22] Filed: Jun. 2, 1992

[30] Foreign Application Priority Data

Jun. 10, 1991 [JP] Japan ................................. 3-166410
Jun. 10, 1991 [JP] Japan ................................. 3-166411

[51] Int. Cl.⁵ ........................................... G11B 11/10
[52] U.S. Cl. ........................................ 369/110; 369/13; 369/112; 360/114; 359/487; 359/495; 359/498; 359/618; 359/629
[58] Field of Search ............... 369/110, 112, 100, 13; 359/485, 487, 494, 495, 498, 618, 629; 360/114

[56] References Cited

U.S. PATENT DOCUMENTS

| | | | |
|---|---|---|---|
| 4,492,436 | 1/1985 | Bergmann | 359/495 |
| 4,627,688 | 12/1986 | Kobayash et al. | 359/639 |
| 4,649,426 | 2/1987 | Shirasaki | 359/487 |
| 4,721,368 | 1/1988 | Deguchi et al. | 369/110 |
| 4,953,124 | 8/1990 | Koyama | 369/110 |
| 5,004,326 | 4/1991 | Sasaki | 369/110 |
| 5,048,030 | 9/1991 | Hiro | 359/495 |
| 5,084,850 | 1/1992 | Yanagawa et al. | 369/124 |
| 5,095,476 | 3/1992 | Greve et al. | 369/110 |
| 5,105,399 | 4/1992 | Shimonou | 369/110 |
| 5,151,889 | 9/1992 | Saimi et al. | 369/112 |

FOREIGN PATENT DOCUMENTS

2251514 7/1992 United Kingdom.

*Primary Examiner*—Paul M. Dzierzynski
*Assistant Examiner*—Drew A. Dunn
*Attorney, Agent, or Firm*—Guy W. Shoup; Patrick T. Bever

[57] ABSTRACT

A light separating element designed to have parallel first and second external surfaces, a first polarizing film disposed on the first external surface and arranged to reflect a first portion of a first component in a first direction and transmit a second portion of the first component and all of a second component in a second direction. Further, a second polarizing film can be disposed on a second external surface which reflects a first portion of the second component in a third direction and transmits a second portion of the first and second components in a fourth direction. Further, the first portion of the second component is reflected by the second polarizing film to strike the first polarizing film. The first polarizing film transmitting a first portion of the second component in a fifth direction or a reflecting surface disposed on the second external surface and arranged to reflect a second portion of a first component and all of a second component in a third direction toward the polarizing film. The first portion of the second component is transmitted by the polarizing film in a fourth direction and a second portion of the second component and the second portion of the first component are reflected in a fifth direction toward the reflective surface. The second portions of the first and second components traveling in the fifth direction are reflected by the reflective surface in a sixth direction toward the polarizing film and the second portions of the first and second components traveling in the sixth direction are transmitted by the polarizing film in a seventh direction.

12 Claims, 7 Drawing Sheets

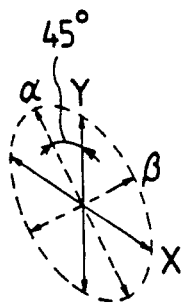
FIG. 9
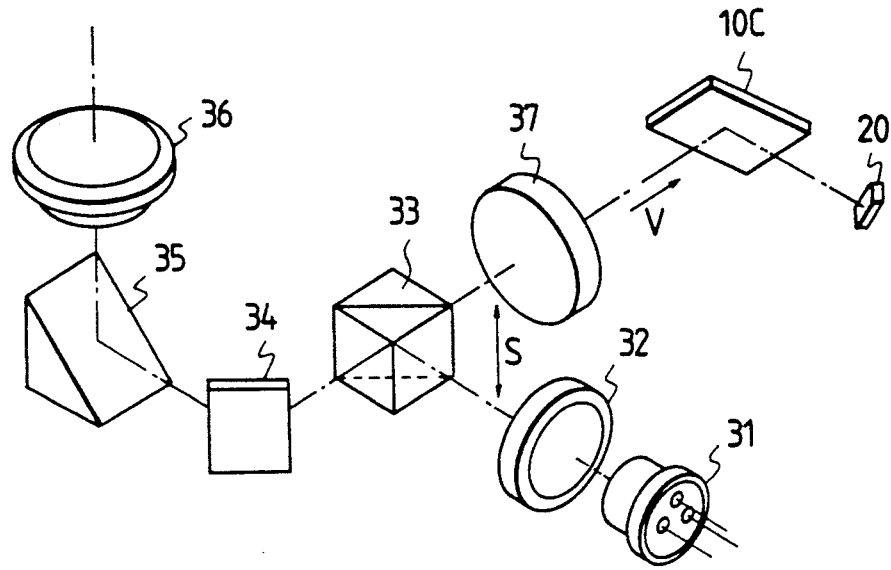
FIG. 10
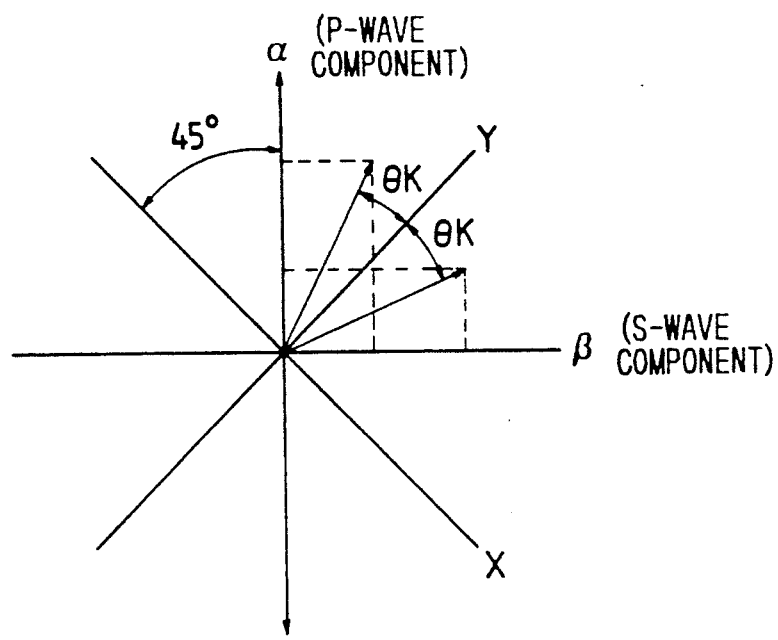

LIGHT SEPARATION ELEMENT AND LIGHT RECEIVING OPTICAL DEVICE USING SAME

BACKGROUND OF THE INVENTION

1. Field of the Invention

The present invention relates to a light separation element which is used in an opto-magnetic disk apparatus or the like for separating light, having polarized components angularly spaced 90 degrees from each other in the rotating direction, into three components and a light receiving optical device using the light separation element.

2. Description of the Prior Art

In an opto-magnetic disk apparatus, polarizing separation is performed to obtain a playback or reproduced output such that light returned from a disk is separated into two light components representing respective polarized components due to a Kerr rotatory angle and a light component for error signal detection from which a focus error signal and so on are detected.

FIG. 11 shows arrangement of an optical system of an opto-magnetic disk apparatus using conventional polarizing separation means.

A laser beam emitted from a semiconductor laser 1 is converted by a collimator lens 2 into a parallel beam which is reflected by a beam splitter 3 and then by a total reflection prism 4. After that, the beam is focused by an object lens 5 onto the recording surface of a disk D. The light reflected by and returned from the recording surface of the disk D passes through the beam splitter 3 and is separated by a Wollaston prism 6 into three components which are received via condensing lenses 7a and 7b by a pin photodiode 8 divided into six zones. Specifically, two light rays B1 and B2 which are separated by the Wollaston prism 6 to have different polarizing planes from each other are received by two light receiving portions 8a and 8b of the pin photodiode 8, respectively. An MO signal is detected from the difference between quantities of light received by those two light receiving portions. The remaining light ray B3 independently of the polarized conditions is received by a light receiving portion 8c divided into four zones, from which both focus and tracking error signals are obtained.

The above conventional light receiving optical device uses the Wollaston prism 6 as an element for polarizing separation. However, the Wollaston prism 6 comprises two pieces of anisotropic crystal, such as quartz, bonded to each other and, therefore, the production cost is expensive. In addition, a cylindrical lens adapted to produce astigmatism requires to be provided as the condensing lens 7b in order to obtain the focus error signal from the four-divided light receiving portion 8c of the pin photodiode 8, thus resulting in the increased number of optical components.

SUMMARY OF THE INVENTION

The present invention is to solve the above-stated problems in the prior art, and its object is to provide a light separation element which enables not only polarizing separation of light but also generation of astigmatism with simple construction, as well as a light receiving optical device using the light separation element.

The present invention according to a first embodiment resides in a light separation element which is positioned in a path of light having first and second polarized components angularly spaced 90 degrees from each other in the rotating direction with respect to the optical axis, wherein a pair of polarizing films each transmitting said first polarized component at a predetermined rate therethrough and transmitting said second polarized component at a predetermined rate therethrough are arranged in parallel to each other, but inclined at an angle with respect to said optical axis, and an optical member for rotating the polarizing plane of light passing therethrough 90 degrees is disposed between said pair of polarizing films.

In a light receiving optical device according to the first embodiment of the present invention, said light separation element is disposed in a path of light having first and second polarized components angularly spaced 90 degrees from each other in the rotating direction with respect to the optical axis, and a light receiving portion for receiving the component of light having passed through both said polarizing films of said light separation element and light receiving portions for receiving the components light respectively reflected by said polarizing films are provided.

The present invention according to a second embodiment resides in a light separation element which is positioned in a path of light having first and second polarized components angularly spaced 90 degrees from each other in the rotating direction with respect to the optical axis, wherein a polarizing film transmitting said first and second polarized components at respective predetermined rates therethrough and a reflection surface positioned behind said polarizing film are arranged in parallel to each other, but inclined at an angle with respect to said optical axis, and an optical member for rotating the polarizing plane of light reciprocally passing therethrough 90 degrees is disposed between said polarizing film and said reflection surface.

A light receiving optical device according to the second embodiment of the present invention, said light separation element is disposed in a path of light having first and second polarized components angularly spaced 90 degrees from each other in the rotating direction with respect to the optical axis, and light receiving portions are provided to receive the component of light reflected by said polarizing film of said light separation element, the component of light that has passed through said polarizing film, is reflected by said reflection surface and then passes through said polarizing film, and the component of light that is reflected by said reflection surface, then by said polarizing film, then by said reflection surface again and thereafter passes through said polarizing film, respectively.

With the present invention of the first embodiment, when returned light of which polarizing plane has been given with a Kerr rotatory angle by an opto-magnetic disk, for example, enters the light separation element, a part of one polarized component is reflected by the polarizing film and the other polarized component passes through it. The optical member for rotating the polarizing plane 90 degrees, which is positioned midway the optical path within the light separation element, makes both the polarized components rotated 90 degrees, followed by reaching the next polarizing film. At the next polarizing film, too, a part of one polarized component is reflected and the other polarized component passes through it. The transmitted light is received by the light receiving portion for detecting a focus error, for example. The components of light reflected by both the polarizing films are different in their polarizing directions from each other and, therefore, an MO signal, etc. can be obtained by determining the difference between detection outputs of those light components.

With the present invention of the second embodiment, when returned light of which polarizing plane has been given with a Kerr rotatory angle by an opto-magnetic disk, for example, enters light separation element, the predetermined polarized component is first reflected by the polarizing film and received by a first light receiving portion. Next, the component of light that has passed through the polarizing film, is reflected by the reflection surface and then passes through the polarizing film is received by a second light receiving portion. Further, of the light reflected by the reflection surface, the component that is reflected by the polarizing film is then reflected by the reflection surface again and thereafter passes through the polarizing film to be received by a third light receiving portion. In an opto-magnetic disk apparatus, for example, an MO signal is detected from the difference between the quantity of light received by the first light receiving portion and the quantity of light received by the third light receiving portion, while both focus and tracking error signals are detected from a detection output of light received by the second light receiving portion.

BRIEF DESCRIPTION OF THE DRAWINGS

FIG. 9 is a perspective view showing layout of an optical system of an opto-magnetic disk apparatus using the light separation element according to the fourth embodiment of the present invention.

FIG. 10 is an explanatory view showing an orientation angle of the light separation element in the apparatus of FIG. 9.

DETAILED DESCRIPTION OF PREFERRED EMBODIMENTS

Preferred embodiments of the present invention will be hereinafter described with reference to the drawings.

Figure 1:
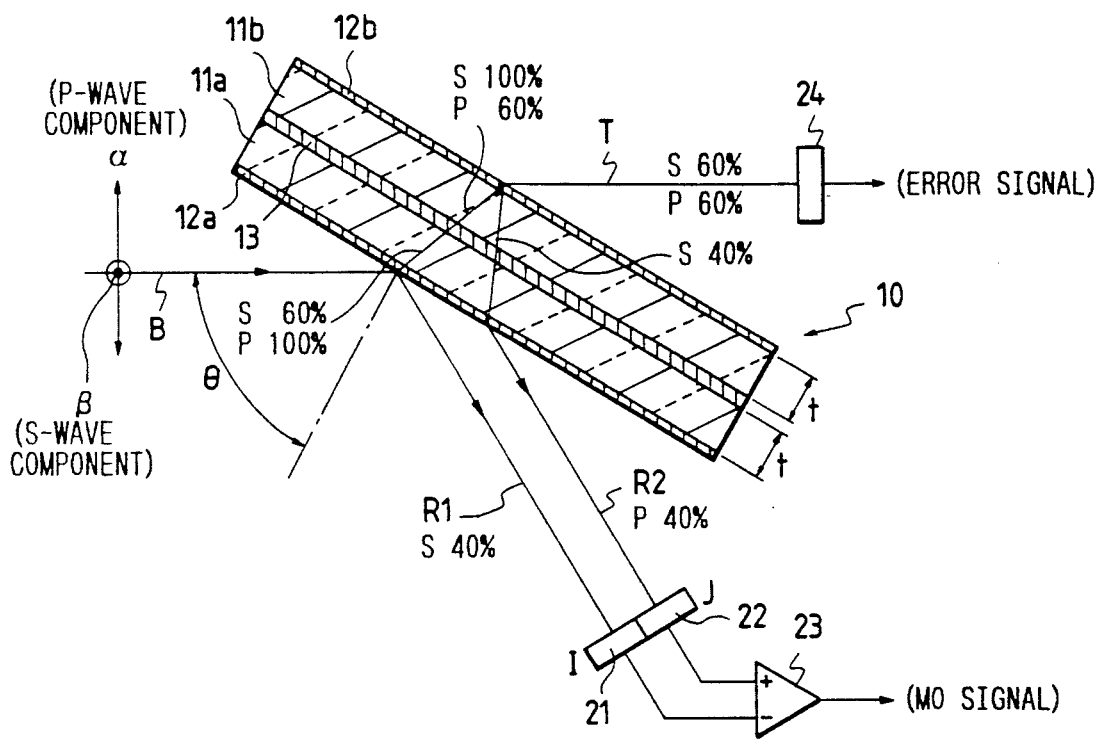
FIG. 1 is a sectional view showing a light separation element according to a first embodiment of the present invention.

FIG. 1 is a sectional view showing a first embodiment of a light separation element 10 according to the present invention.

In FIG. 1, denoted by reference characters 11a and 11b are flat plates of glass with the same thickness t. Polarizing films 12a and 12b are respectively coated on the surfaces of these flat plates of glass 11a and 11b. Between both the flat plates of glass 11a and 11b, there is interposed a phase difference plate 13 which causes a phase difference of $\lambda/2$ (where $\lambda$ is the wavelength of light) for the light passing therethrough.

It is assumed in FIG. 1 that orthogonal coordinates of $\alpha-\beta$ is defined with the $\alpha$ axis representing the vertical direction on the drawing sheet and the $\beta$ axis representing a direction normal to the drawing sheet, a component of light which has the polarizing plane in the direction of $\alpha$ is a P-wave component, and further a component of light which has the polarizing plane in the direction of $\beta$ is an S-wave component. Also, an incident angle of the optical axis B of incident light with respect to a light separation element 10 is assumed to be $\theta$.

The incident angle $\theta$ is almost equal to the Brewster's angle and is set to about 60 degrees, for example, when the flat plates of glass 11a and 11b each have a refractive index of 1.51. Depending on design of the Brewster's angle $\theta$ and the polarizing films 12a, 12b, the light separation element 10 is set so that 100% of the P-wave passes through the polarizing films 12a and 12b, 60% of the S-wave passes therethrough, and 40% of the S-wave is reflected thereby. These ratios can be optionally set.

Because the light having passed through the phase difference plate 13, which causes a phase difference of $\lambda/2$, is rotated 90 degrees in its polarizing plane, the P-wave component turns to an S-wave component and the S-wave component turns to a P-wave component.

Functions of the light separation element 10 will now be explained.

When the incident light enters the light separation element 10 at the incident angle $\theta$, 40% of the S-wave component is reflected by the polarizing film 12a and the remaining 60% thereof passes through it. Also, 100% of the P-wave component passes through the polarizing film 12a. Thus, at the polarizing film 12a, only 40% of the S-wave component of the incident light is reflected. This reflected light is indicated by R1 in FIG. 1.

60% of the S-wave component and 100% of the P-wave component both having passed through the polarizing film 12a pass through the flat plate of glass 11a and then the phase difference plate 13. Because the polarizing plane is rotated 90 degrees by the phase difference plate 13, the light passing through the next flat plate of glass 11b comprises 100% of the S-wave component and 60% of the P-wave component.

At the next polarizing film 12b, 40% of the S-wave component is reflected and the remaining 60% passes therethrough. The P-wave component is not reflected. Accordingly, the light that is reflected by the polarizing film 12b and returned through the flat plate of glass 11b is only 40% of the S-wave component. Since this S-wave component passes through the phase difference plate 13 again, it is rotated 90 degrees in its polarizing plane so that 40% of the S-wave component turns to a P-wave component. This P-wave component is not reflected by the polarizing film 12a and all passes therethrough. As a result, the component reflected by the polarizing film 12b is outputted as the P-wave component in parallel to the above reflected light R1. This reflected light comprising 40% of the P-wave component is indicated by R2.

Further, at the polarizing film 12b, the remaining 60% of the S-wave component passes and 60% of the P-wave component all passes therethrough as it is. Accordingly, the transmitted light, denoted by T, that has passed through the light separation element 10 is of light having 60% of both the S-wave component and the P-wave component.

FIG. 1 shows the case where the light separation element 10 is arranged in a path of the returned light (condensed light) from the recording surface of a disk in an opto-magnetic disk apparatus.

In a path of the reflected light R1 comprising 40% of the S-wave component and a path of the reflected light R2 comprising 40% of the P-wave component, there are disposed light receiving portions 21 and 22 of a pin photodiode, respectively. By arranging a differential amplifier 23 to obtain the difference between quantities of light received by both the light receiving portions (i.e., between an I output and a J output corresponding to light received thereby), it is possible to known the difference between the I output and the J output, namely, the difference between the quantities of light of the S-wave component and the P-wave component, and to obtain an MO signal of the opto-magnetic disk.

Figure 11:
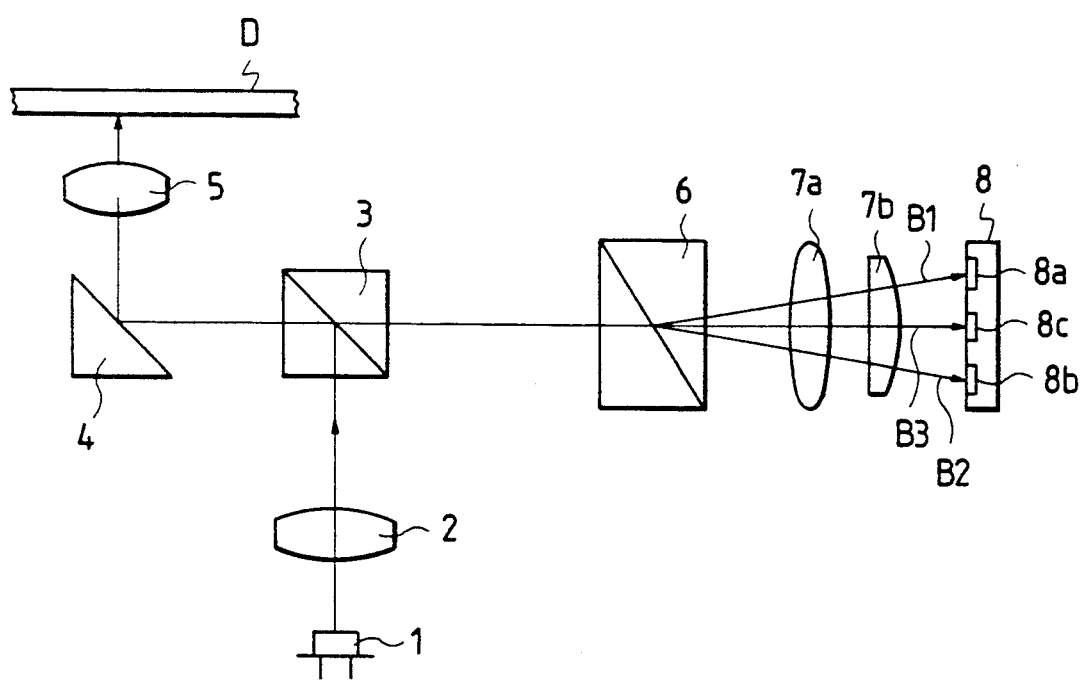
FIG. 11 is a side view showing layout of a conventional light separation element and a light receiving optical device using the conventional light separation element.

In a path (at the condensed point) of the transmitted light T, a pin photodiode 24 divided into four zones is disposed. Because the transmitted light T is of light not depending on polarized conditions of the returned light, a focus error signal and a tracking error signal can be obtained by detecting the transmitted light T by the four-divided light receiving portion. Specifically, since the light separation element 10 is entirely of the flat-plate structure, the transmitted light (condensed light) T having passed through the element 10 undergoes astigmatism. By utilizing this astigmatism, the focus error signal can be obtained from the four-divided light receiving portion. Therefore, there is no need of using a cylindrical lens as the condensing lens 7b which has been employed in the prior art shown in FIG. 11.

Note that the tracking error signal can be detected from the four-divided light receiving portion by the so-called push-pull method.

Figure 4:
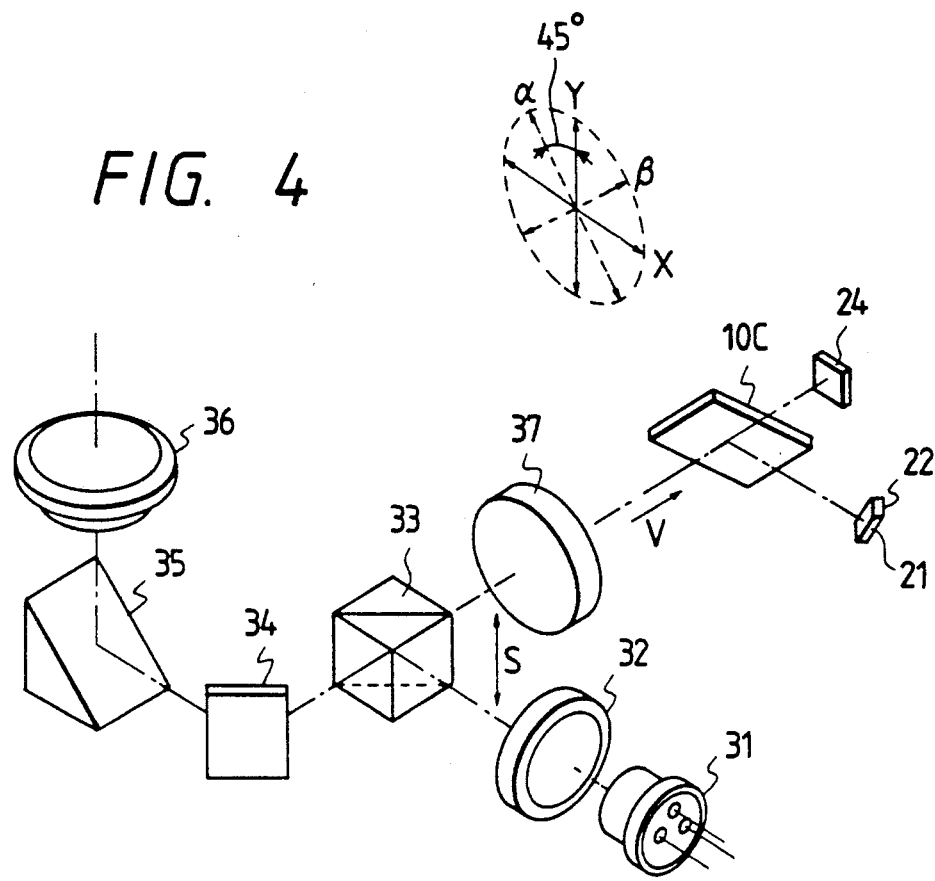
FIG. 4 is a perspective view showing layout of an optical system of an opto-magnetic disk apparatus using the light separation element of the present invention.

FIG. 4 shows detailed arrangement of an optical system of the opto-magnetic disk apparatus using the light separation element 10.

A laser beam emitted from a semiconductor laser 31 is converted by a collimator lens 32 into a parallel beam. A part (primarily S-wave component) of the laser beam is reflected by a polarizing beam splitter 33, then by a movable mirror 34 for tracking correction, and further by a total reflection prism 35 to be focused by an object lens 36 onto the recording surface of a disk. The light reflected from the recording surface of the disk returns along the same path, but after passing through the polarizing beam splitter 33, it is condensed by a condensing lens 37 to enter the light separation element 10.

Figure 5:
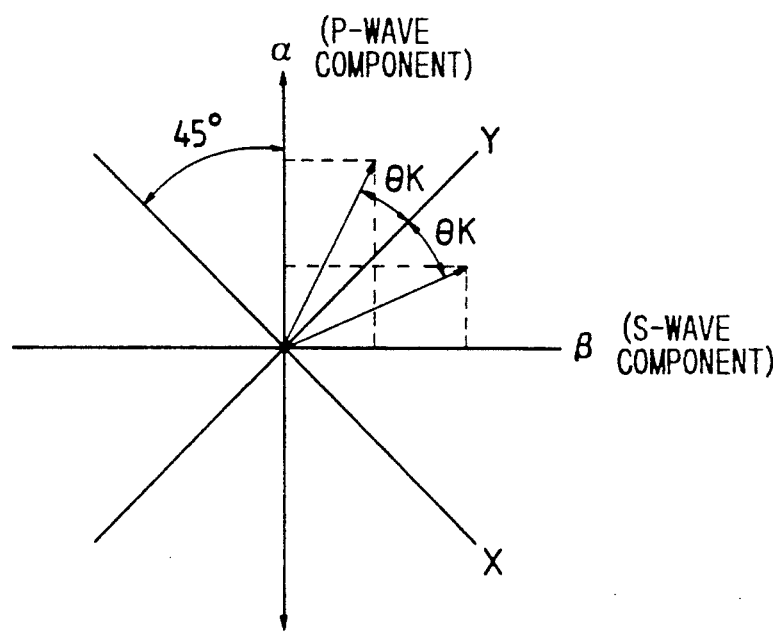
FIG. 5 is an explanatory view showing an orientation angle of the light separation element in the apparatus of FIG. 4.

FIG. 5 shows an orientation angle of the light separation element 10 as viewed in the incident direction to the light separation element 10 (i.e., in the direction of V in FIG. 4). Assuming in the apparatus of FIG. 4 that orthogonal coordinates with X representing the horizontal direction and Y representing the vertical direction, the orthogonal coordinates with the $\alpha$ and $\beta$ axes shown in FIG. 1 are arranged at an angle rotated 45 degrees about the optical axis with respect to the orthogonal coordinates of X-Y.

Let it now be assumed that the returned light from the opto-magnetic disk is given with a Kerr rotatory angle and its polarizing plane is rotated $\theta k$ in the minus or plus direction with respect to the Y axis as shown in FIG. 5. In the light separation element 10 of FIG. 1, the component corresponding to the polarizing plane rotated $\theta k$ is separated into a P-wave component in the direction of $\alpha$ and an S-wave component in the direction of $\beta$, the difference between both the components being detected by the light receiving portions 21 and 22. Accordingly, the direction of rotation of the polarizing plane represented by the plus $\theta k$ or minus $\theta k$ in FIG. 5 can be detected from an output of the differential amplifier 23 to reproduce the MO signal.

Figure 2:
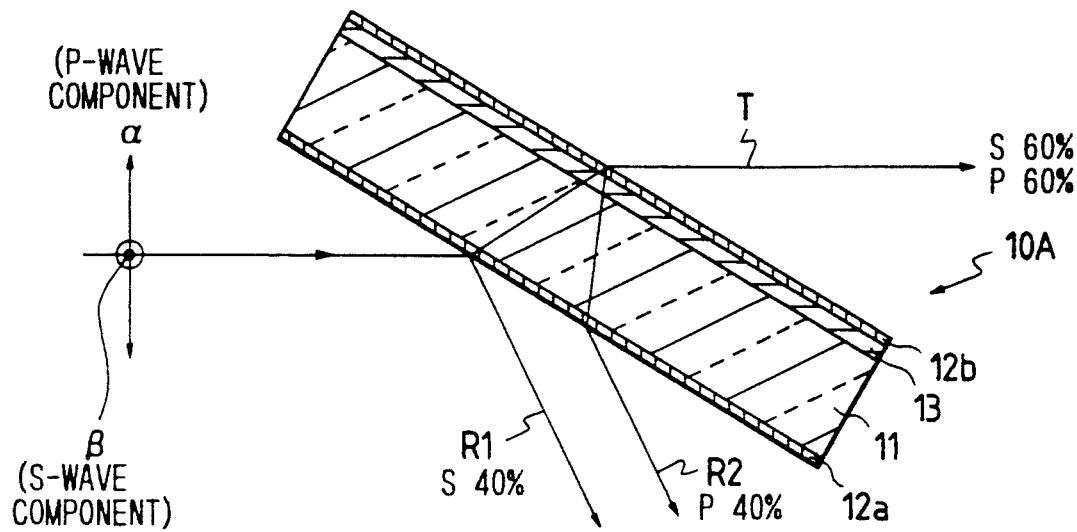
FIG. 2 is a sectional view showing a light separation element according to a second embodiment of the present invention.

FIG. 2 shows a second embodiment of the light separation element according to the present invention.

This embodiment uses a single flat plate of glass instead of the two flat plates of glass in FIG. 1. More specifically, a light separation element 10A of FIG. 2 has the structure that the polarizing film 12a, a flat plate of glass 11, and the phase difference plate 13 giving a phase difference of $\lambda/2$, and the polarizing film 12b are arranged in this order from the incident side. This light separation element 10A functions in the same manner as the light separation element 10 shown in FIG. 1. Thus, incident light is separated into the reflected light R1 comprising 40% of the S-wave component, the reflected light R2 comprising 40% of the P-wave component, and the transmitted light T comprising 60% of both the S-wave component and the P-wave component.

Figure 3:
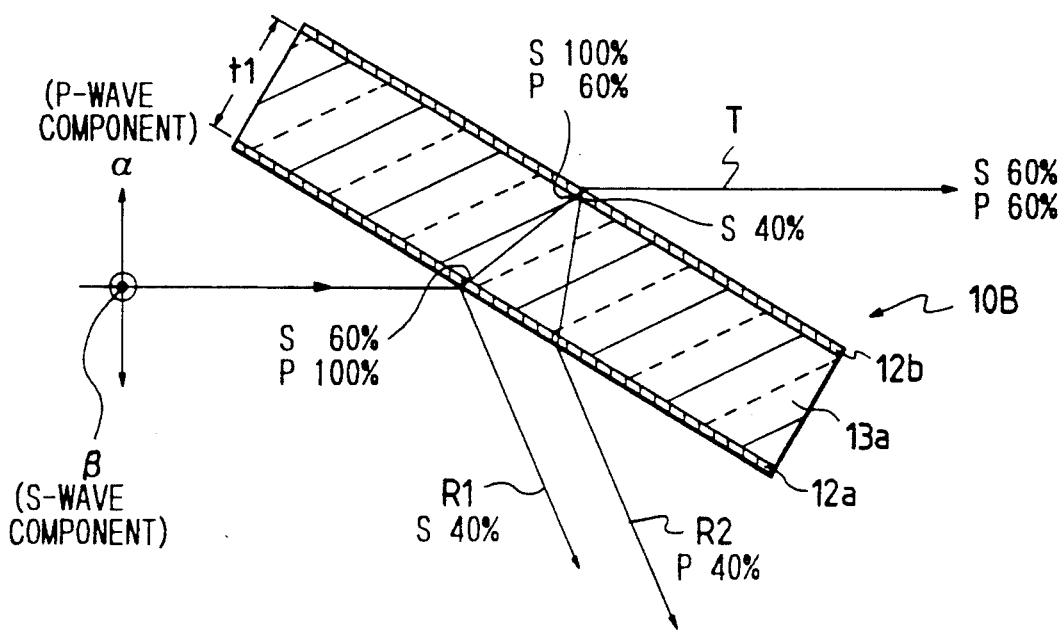
FIG. 3 is a sectional view showing a light separation element according to a third embodiment of the present invention.

A third embodiment shown in FIG. 3 is further simplified in the structure.

In a light separation element 10B of this embodiment, polarizing films 12a and 12b are directly coated on both sides of a phase difference plate 13a which is formed of an anisotropic crystal such as quartz and has such a thickness t1 as able to cause a phase difference of $\lambda/2$ for the light passing therethrough.

With this embodiment, 100% of the P-wave component and 60% of the S-wave component pass through the polarizing film 12a on the front surface. These transmitted components are rotated 90 degrees in their polarizing planes while propagating through the phase difference plate 13a, and turn to 100% of the S-wave component and 60% of the P-wave component, respectively, at the time reaching the polarizing film 12b on the rear surface. At the polarizing film 12b, 60% of both the S-wave component and the P-wave component pass therethrough to provide transmitted light T, but 40% of the S-wave component is reflected. This S-wave component turns to a P-wave component while propagating through the phase difference plate 13a, and then passes through the polarizing film 12a. Accordingly, 40% of both the P-wave component and the S-wave component are obtained as reflected light R1 and R2, respectively.

It should be understood that the present invention is not limited to the above embodiments. In the second embodiment of FIG. 2, for example, the phase difference plate 13 may be disposed next to the polarizing film 12a on the front surface, followed by the flat plate of glass 11 and the polarizing film 12b in this order.

Figure 6:
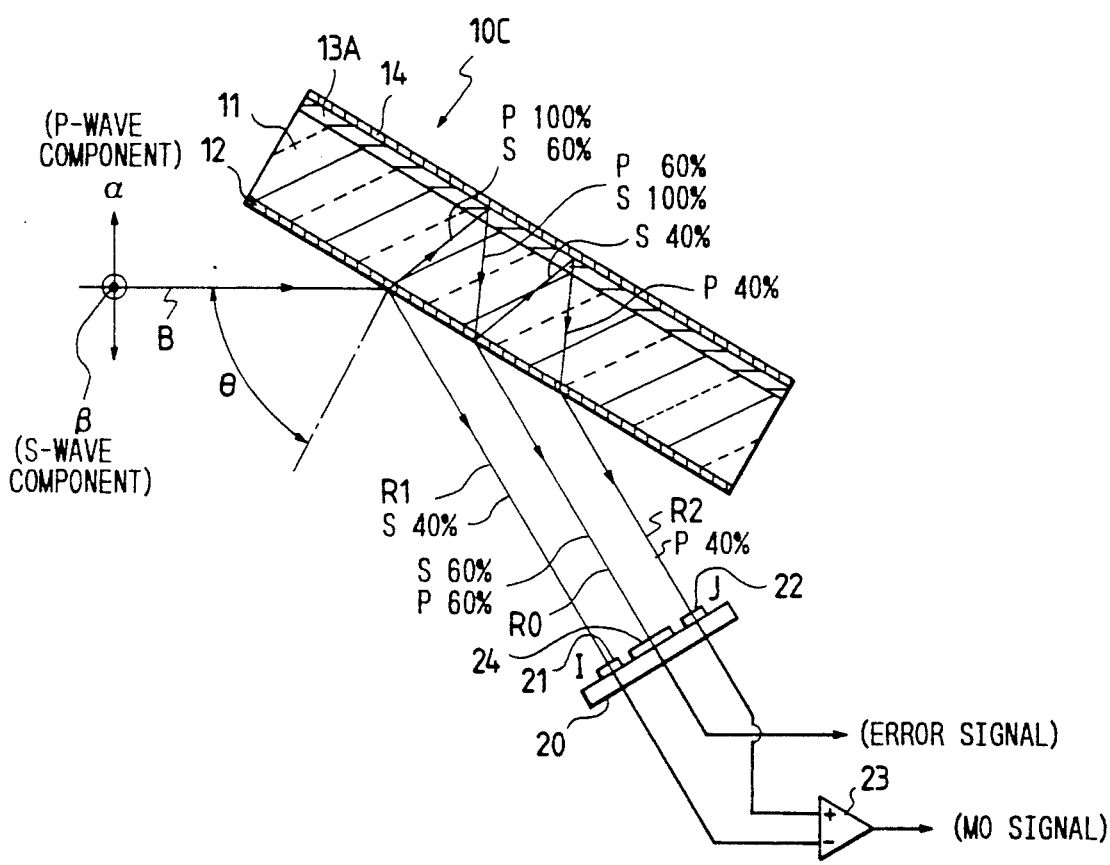
FIG. 6 is a sectional view showing a light separation element according to a fourth embodiment of the present invention.

FIG. 6 is a sectional view showing a fourth embodiment of the light separation element according to the present invention.

Note that, in FIGS. 6 to 10, the same components as those in FIGS. 1 to 5 are denoted by the same reference characters.

A light separation element 10C shown in FIG. 6 is of the structure that a polarizing film 12 is coated on the incident-side surface of a flat plate of glass 11. A phase difference plate 13A is bonded to the rear surface of the flat plate of glass 11, and a total reflection film 14 is coated on the rear surface of the phase difference plate 13A. The phase difference plate 13A causes a phase difference of $\lambda/4$ (or $5\lambda/4$, $9\lambda/4$) (where $\lambda$ is the wavelength of light of incident light) for the light passing therethrough. Accordingly, the light that, after having passed through the phase difference plate 13A, is reflected by the total reflection film 14 and passes through the phase difference plate 13A once again is subjected to a phase difference of $\lambda/2$ by passing through the phase difference plate 13A twice and rotated 90 degrees in angle of its polarizing plane.

It is assumed in FIG. 6 that orthogonal coordinates of $\alpha-\beta$ is defined with the $\alpha$ axis representing the vertical direction on the drawing sheet and the $\beta$ axis representing a direction normal to the drawing sheet, a component of light which has the polarizing plane in the direction of $\alpha$ is a P-wave component, and further a component of light which has the polarizing plane in the direction of $\beta$ is an S-wave component. Also, an incident angle of the optical axis B of incident light with respect to a light separation element 10C is assumed to be $\theta$.

The incident angle $\theta$ is almost equal to the Brewster's angle and is set to about 60 degrees, for example, when the flat plate of glass 11 has a refractive index of 1.51. Depending on design of the Brewster's angle $\theta$ and the polarizing films 12, the light separation element 10C is set so that 100% of the P-wave passes through the polarizing films 12, 60% of the S-wave passes therethrough, and 40% of the S-wave is reflected thereby. These ratios can be optionally set.

Because the light having passed through the phase difference plate 13A reciprocally is rotated 90 degrees in its polarizing plane, the P-wave component turns to an S-wave component and the S-wave component turns to a P-wave component.

Functions of the light separation element 10C will now be explained.

When the incident light enters the light separation element 10C at the incident angle $\theta$, 40% of the S-wave component is reflected by the polarizing film 12 and the remaining 60% thereof passes through it. Also, 100% of the P-wave component passes through the polarizing film 12. Thus, at the polarizing film 12, only 40% of the S-wave component of the incident light is reflected. This reflected light is indicated by R1 in FIG. 6.

60% of the S-wave component and 100% of the P-wave component both having passed through the polarizing film 12 pass through the flat plate of glass 11 and then the phase difference plate 13A, following which those components are reflected by the total reflection film 14 to return while passing through the phase difference plate 13A. Because the reflected light returning through the flat plate of glass 11 after having passed through the phase difference plate 13A reciprocally is rotated 90 degrees in its polarizing plane, there are resulted 100% of the S-wave component and 60% of the P-wave component.

The light reflected by the total reflection film 14 reaches the polarizing film 12 again. Now, at the polarizing film 12, 40% of the S-wave component is reflected and the remaining 60% passes therethrough. The P-wave component is not reflected and all passes through the polarizing film 12. Accordingly, the light having passed through the polarizing film 12 is of light comprising 60% of both the S-wave component and the P-wave component and thus independently of polarized conditions of the returned light. This resultant light is indicated by R0.

On the other hand, 40% of the S-wave component that is reflected by the polarizing film 12 to return into the flat plate of glass 11 again passes through the phase difference plate 13A, is reflected by the total reflection film 14 and then passes through the phase difference plate 13A once again, followed by entering the flat plate of glass 11. Through this process of going to and back through the phase difference plate 13A, 40% of the S-wave component turns to a P-wave component. This 40% of the P-wave component all passes through the polarizing film 12. This resultant light is indicated by R2 in FIG. 6.

FIG. 6 shows the case where the light separation element 10C is arranged in a path of the returned light (condensed light) from the recording surface of a disk in an opto-magnetic disk apparatus.

In paths of the above respective light components R0, R1, R2, there is disposed a pin photodiode 20 divided into six zones. This pin photodiode 20 has two light receiving portions 21, 22 and a light receiving portion 24 divided into four zones.

The light R1 comprising 40% of the S-wave component is detected by the light receiving portion 21 and the light R2 comprising 40% of the P-wave component is detected by the light receiving portion 22. Quantities of light received by both the light receiving portions are inputted to a differential amplifier 23. The differential amplifier 23 detects the difference between quantities of light received by both the light receiving portions 21 and 22 (i.e., difference between an I output and a J output), the detected result becoming a reproduced output (MO signal) from the opto-magnetic disk.

The four-divided light receiving portion 24 is positioned at the condensed point of the light R0 comprising 60% of both the S-wave component and the P-wave component. A focus error signal and a tracking error signal can be obtained from outputs detected by the four-divided light receiving portion 24. Specifically, since the light separation element 10C is entirely of the flat-plate structure, the condensed light R0 passing through the element 10C twice via reflection undergoes astigmatism. By utilizing this astigmatism, the focus error signal can be obtained from the four-divided light receiving portion. Therefore, there is no need of using a cylindrical lens as the condensing lens 7b which has been employed in the prior art shown in FIG. 11. Note that the tracking error signal can be detected from the four-divided light receiving portion by the so-called push-pull method.

FIG. 9 shows detailed arrangement of an optical system of the opto-magnetic disk apparatus using the light separation element 10C.

A laser beam emitted from a semiconductor laser 31 is converted by a collimator lens 32 into a parallel beam. A part (primarily S-wave component) of the laser beam is reflected by a beam splitter 33, then by a movable mirror 34 for tracking correction, and further by a total reflection prism 35 to be focused by an object lens 36 onto the recording surface of a disk. The light reflected from the recording surface of the disk returns along the same path, but after passing through the beam splitter 33, it is condensed by a condensing lens 37 to enter the light separation element 10C.

FIG. 10 shows an orientation angle of the light separation element 10C as viewed in the incident direction to the light separation element 10C (i.e., in the direction of V in FIG. 9). Assuming in the apparatus of FIG. 9 that orthogonal coordinates with X representing the horizontal direction and Y representing the vertical direction, the orthogonal coordinates with the $\alpha$ and $\beta$ axes shown in FIG. 6 are arranged at an angle rotated 45 degrees about the optical axis with respect to the orthogonal coordinates of X-Y axes.

Let it now be assumed that the returned light from the opto-magnetic disk is given with a Kerr rotatory angle and its polarizing plane is rotated $\theta k$ in the minus or plus direction with respect to the Y axis as shown in FIG. 10. In the light separation element 10C of FIG. 6, the component corresponding to the polarizing plane rotated $\theta k$ is separated into a P-wave component in the direction of $\alpha$ and an S-wave component in the direction of $\beta$, the difference between both the components being detected by the light receiving portions 21 and 22. Accordingly, the direction of rotation of the polarizing plane represented by the plus $\theta k$ or minus $\theta k$ in FIG. 10 can be detected from an output of the differential amplifier 23 to reproduce the MO signal.

Figure 7:
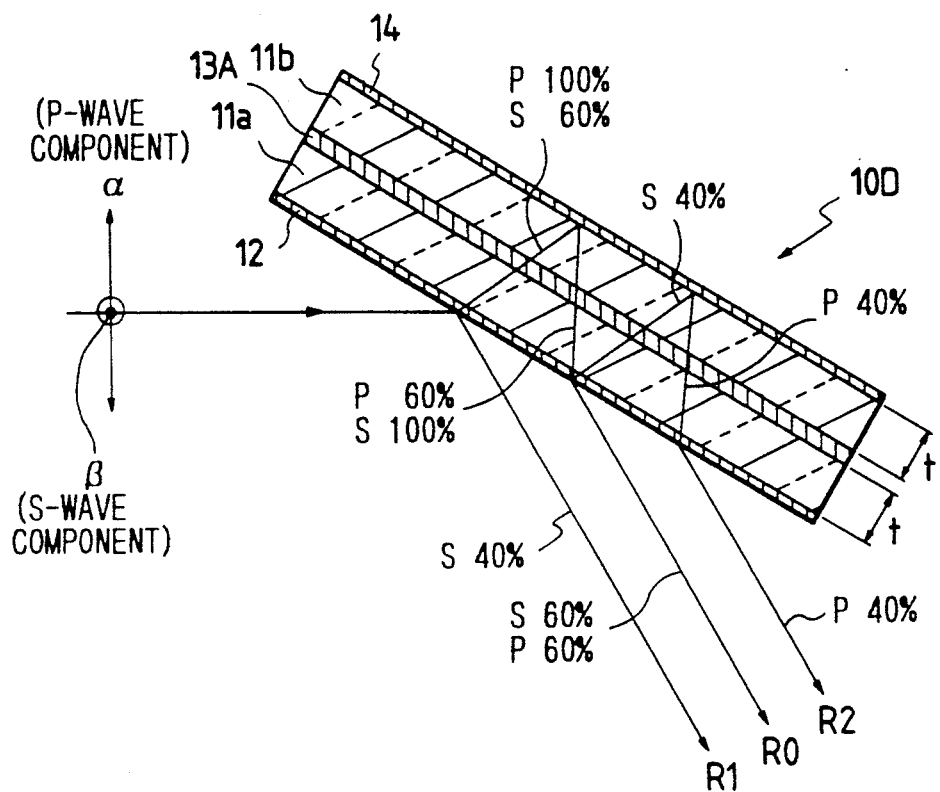
FIG. 7 is a sectional view showing a light separation element according to a fifth embodiment of the present invention.

FIG. 7 shows a fifth embodiment of the light separation element according to the present invention.

In a light separation element 10D of this embodiment, the phase difference plate 13A is interposed between two flat plates of glass 11a and 11b having the same thickness t. Then, the polarizing film 12 is coated on the surface of the flat plate of glass 11a, and the total reflection film 14 is coated on the rear surface of the flat plate of glass 11b. As with the fourth embodiment, the phase difference plate 13A causes a phase difference of $\lambda/2$ for the light passing therethrough twice, thereby rotating the angle of the polarizing plane 90 degrees.

In this light separation element 10C, too, 40% of the S-wave component is reflected by the polarizing film 12 to provide the light component R1. Also, 100% of the P-wave component and 60% of the S-wave component both having passed through the polarizing film 12 are reflected by the total reflection film 14 to pass through the phase difference plate 13A reciprocally, so that they turn to 60% of the P-wave component and 100% of the S-wave component, respectively. Then, the light component RO comprising 60% of both the S-wave component and the P-wave component is obtained. Further, 40% of the S-wave component reflected by the polarizing film 12 is then reflected by the total reflection film 14 and turns to a P-wave component after passing through the phase difference plate 13A reciprocally. This P-wave component is obtained as R2 after having passed through the polarizing film 12.

Although the two flat plates of glass 11a, 11b are not necessarily to have the same thickness in the light separation element 10D, manufacture of these flat plates of glass can be facilitated if they have the same thickness.

Figure 8:
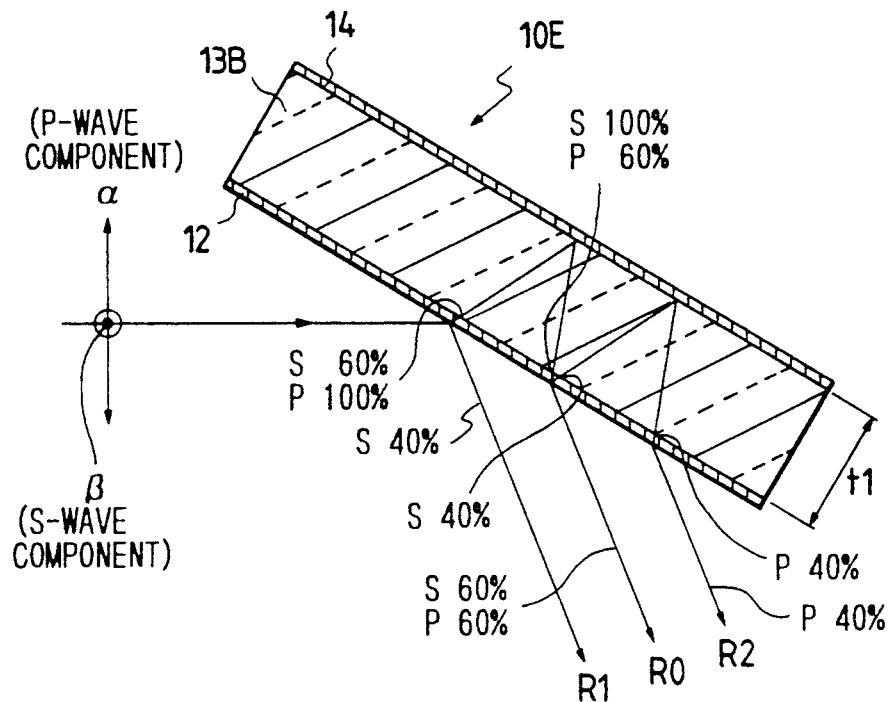
FIG. 8 is a sectional view showing a light separation element according to a sixth embodiment of the present invention.

A sixth embodiment shown in FIG. 8 is further simplified in the structure.

In a light separation element 10E of this embodiment, there is used a phase difference plate 13B which is formed of an anisotropic crystal such as quartz and has such a thickness t1 as able to cause a phase difference of $\lambda/2$ for the light passing therethrough reciprocally (i.e., twice). The polarizing film 12 is directly coated on the front surface of the phase difference plate 13B and the total reflection film 14 is directly coated on the rear surface thereof. With this embodiment, 100% of the P-wave component and 60% of the S-wave component pass through the polarizing film 12. These transmitted components are rotated 90 degrees in their polarizing planes during the process that it propagates through the phase difference plate 13B, is reflected by the total reflection film 14 and then propagates through the phase difference plate 13B again, and turn to 100% of the S-wave component and 60% of the P-wave component, respectively, at the time returning to the polarizing film 12. At the polarizing film 12, 60% of both the S-wave component and the P-wave component pass therethrough to provide the light RO. Further, 40% of the S-wave component reflected by the polarizing film 12 turns to a P-wave component while propagating through the phase difference plate 13B reciprocally, and then passes through the polarizing film 12 to provide the light R2 comprising 40% of the P-wave component.

It should be understood that the present invention is not limited to the above embodiments. In the fourth embodiment of FIG. 6, for example, the polarizing film 12, the phase difference plate 13A, the flat plate of glass 11 and the total reflection film 14 may be arranged in this order from the incident side.

According to the present invention of claims 1 and 2 fully described above, a light separation element of small size and simple construction can be obtained. Use of this light separation element enables a small-sized light receiving optical device. In addition, since the light separation element can be of the flat-plate structure to make astigmatism occur on the light passing through the element, a focus error can be detected without needing an additional member.

Further, according to the present invention of claims 3 and 4, since incident light is separated into three components propagating in the same direction, light receiving portions for detecting the respective light components can be disposed at the same position, thus enabling use a single pin photodiode or the like.

What is claimed is:

1. A light separation element positioned in a path of light having first and second polarized components angularly spaced 90 degrees from each other in a rotating direction with respect to an optical axis, wherein a pair of polarizing films each transmitting said first polarized component at a predetermined rate therethrough and transmitting said second polarized component at a predetermined rate therethrough are arranged in parallel to each other on opposite surfaces of said light separation element, but inclined at an angle with respect to said optical axis, and an optical member for rotating the polarizing plane of light passing therethrough 90 degrees is disposed between said pair of polarizing films.

2. A light receiving optical device wherein said light separation element according to claim 1 is disposed in a path of light having first and second polarized components angularly spaced 90 degrees from each other in the rotating direction with respect to the optical axis, and a light receiving portion for receiving the component of light having passed through both said polarizing films of said light separation element and light receiving portions for receiving the components of light respectively reflected by said polarizing films are provided.

3. A light separation element positioned in a path of light having first and second polarized components angularly spaced 90 degrees from each other in a rotating direction with respect to an optical axis, wherein a polarizing film transmitting said first and second polarized components at respective predetermined rates therethrough and a reflection surface positioned behind said polarizing film are arranged in parallel to each other on opposite surfaces of said light separation element, but inclined at an angle with respect to said optical axis, and an optical member for rotating the polarizing plane of light reciprocally passing therethrough 90 degrees is disposed between said polarizing film and said reflection surface.

4. A light receiving optical device wherein said light separation element according to claim 3 is disposed in a path of light having first and second polarized components angularly spaced 90 degrees from each other in the rotating direction with respect to the optical axis, and light receiving portions are provided to receive the component of light reflected by said polarizing film of said light separation element, the component of light that has passed through said polarizing film, is reflected by said reflection surface and then passes through said polarizing film, and the component of light that is reflected by said reflection surface, then by said polarizing film, then by said reflection surface again and thereafter passes through said polarizing film, respectively.

5. An optical device for reading an optical disk, said optical device having a light source for emitting light which is reflected from the optical disk, the reflected light traveling along an optical axis and having a first component and a second component orientated 90° from said first component with respect to said optical axis; said optical device comprising:
a light separating element comprising:
parallel first and second external surfaces positioned such that said reflected light strikes said first external surface at an angle with respect to said optical axis,
a first polarizing film disposed on said first external surface and arranged to reflect a first portion of said first component in a first direction and transmit a second portion of said first component and all of said second component in a second direction, and
a second polarizing film disposed on said second external surface and arranged to reflect a first portion of said second component in a third direction and transmit second portions of said first and second components in a fourth direction,
wherein said first portion of said second component is reflected by said second polarizing film to strike said first polarizing film, said first polarizing film transmitting said first portion of said second component in a fifth direction.

6. An optical device according to claim 5, wherein said first and fifth directions are parallel.

7. An optical device according to claim 5, further comprising a first photodiode disposed to receive said first portion of said first component, a second photodiode disposed to receive said second portion of said first component and said second portion of said second component, and a third photodiode disposed to receive said first portion of said second component.

8. An optical device according to claim 5 further comprising means for altering phases of said first and second components, said means for altering being disposed between said first and second polarizing films.

9. An optical device for reading an optical disk, said optical device having a light source emitting light which is reflected from the optical disk, the reflected light traveling along an optical axis and having a first component and a second component orientated 90° from said first component with respect to said optical axis; said optical device comprising:
a light separating element comprising:
parallel first and second external surfaces positioned such that said reflected light strikes said first external surface at an angle with respect to said optical axis,
a polarizing film disposed on said first external surface and arranged to reflect a first portion of said first component in a first direction and transmit a second portion of said first component and all of said second component in a second direction, and
a reflecting surface disposed on said second external surface and arranged to reflect said second portion of said first component and all of said second component in a third direction toward said polarizing film,
wherein a first portion of said second component is transmitted by said polarizing film in a fourth direction and a second portion of said second component and said second portion of said first component are reflected in a fifth direction toward said reflective surface,
wherein said second portions of said first and second components traveling in said fifth direction are reflected by said reflective surface in a sixth direction toward said polarizing film, and
wherein said second portions of said first and second components traveling is said sixth direction are transmitted by said polarizing film in an seventh direction.

10. An optical device according to claim 9, wherein said first, fourth and seventh directions are parallel.

11. An optical device according to claim 9, further comprising a first photodiode disposed to receive said first portion of said first component, a second photodiode disposed to receive said second portion of said first component and said second portion of said second component, and a third photodiode disposed to receive said first portion of said second component.

12. An optical device according to claim 9 further comprising means for altering phases of said first and second components disposed between said polarizing film and said reflective surface.

* * * * *